Jan. 13, 1959  A. W. TONDREAU  2,868,065
STEREOSCOPIC CAMERA SYSTEM
Filed May 11, 1953  5 Sheets-Sheet 1

INVENTOR.
Albert W. Tondreau

Jan. 13, 1959     A. W. TONDREAU     2,868,065
STEREOSCOPIC CAMERA SYSTEM
Filed May 11, 1953     5 Sheets-Sheet 3

INVENTOR.
Albert W. Tondreau

Jan. 13, 1959
A. W. TONDREAU
2,868,065
STEREOSCOPIC CAMERA SYSTEM
Filed May 11, 1953
5 Sheets-Sheet 4
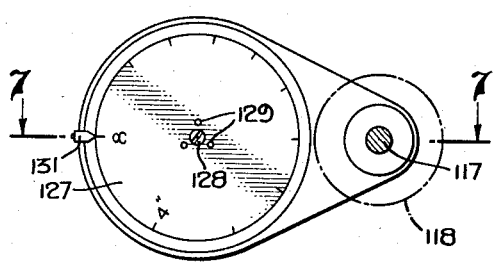
FIG. 6.
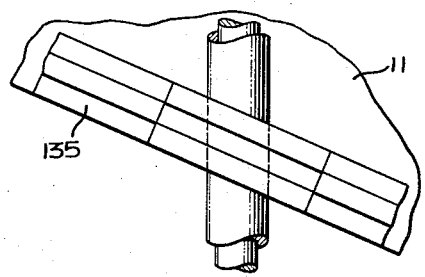
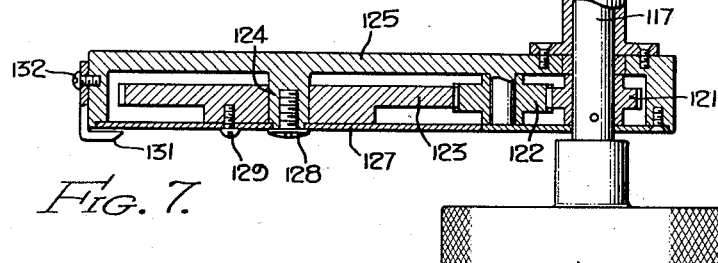
FIG. 7.
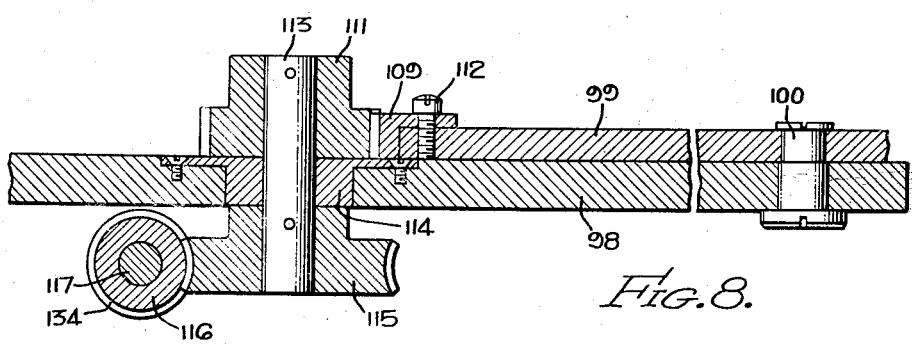
FIG. 8.
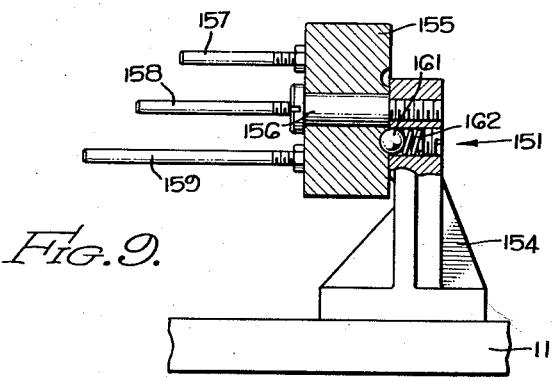
FIG. 9.
INVENTOR.
Albert W. Tondreau Jan. 13, 1959  A. W. TONDREAU  2,868,065
STEREOSCOPIC CAMERA SYSTEM
Filed May 11, 1953  5 Sheets-Sheet 5

INVENTOR.
Albert W. Tondreau

United States Patent Office 2,868,065
Patented Jan. 13, 1959

2,868,065

STEREOSCOPIC CAMERA SYSTEM

Albert W. Tondreau, Van Nuys, Calif., assignor to Warner Bros. Pictures, Inc., Burbank, Calif., a corporation of Delaware Application May 11, 1953, Serial No. 354,098

2 Claims. (Cl. 88—16.6)

This invention relates to cameras, and particularly to a stereoscopic camera system suitable for the photographing of motion pictures to be projected in three dimensions.

Cameras for simultaneously photographing a scene from different angles or positions are well-known, such cameras being called stereoscopic or three dimension cameras. They have been used both for still pictures and for motion pictures. In such systems, there are certain fundamental factors which must be observed. First, to simultaneously provide the proper images on two films through two optical systems, the distance from any point on an object being photographed to each film should be the same. Secondly, in the photographing of motion pictures where long shots, intermediate shots, and close-ups are photographed, it becomes important that the distance between the lenses of the two cameras be adjustable and capable of being brought together closer than the normal separation between a person's eyes. If all scenes were shots of one distance, the adjustments would be quite simple. However, in motion picture production where shots of various distances are used to depict the story, it is necessary that the photographing camera lenses and cameras be capable of a plurality of adjustments with close positioning of the optical paths in order to avoid the distortion and eye strain, which would otherwise be introduced during the projection of the picture.

The present invention is directed to a stereoscopic camera system using two camera units, one of which is provided with an adjustable film advancing mechanism, a housing therefor, and a fixed right-angle optical system, and the other of which is provided with an adjustable film advancing mechanism, a housing therefor, and an adjustable in-line optical system which can be positioned at a minimum separation distance from the other optical system, focusing being accomplished by movement of the film advancing mechanisms and housings of the camera units with respect to their respective optical systems. The system also provides for individual adjustments of each camera unit film advancing mechanism and the simultaneous adjustment thereof. That is, after the individual adjustments of the film advancing mechanisms of the camera units with respect to their lenses have been made, the films in the film advancing mechanisms can then be adjusted simultaneously by adjusting the mechanisms from a plurality of points for focusing on scenes at different distances. The system is adapted to use lenses of different focal lengths, automatic means being provided for adjusting each individual camera unit film advancing mechanism with respect to the lenses being used therein.

The camera unit film advancing mechanism having the in-line optical unit produces a negative, which has the sound track in the standard position, and which can be used to project a two-dimensionable picture when used alone or a three-dimensionable picture when used with its companion film. The present system also permits the close positioning of the optical paths without the light losses obtained when partially silvered mirrors are employed. Also, parts of the optical paths may overlap without producing shadows.

The principal object of the invention, therefore, is to facilitate the photographing of a scene from two different angles or positions.

Another object of the invention is to provide an improved stereoscopic camera system.

A further object of the invention is to provide a stereoscopic camera system having individual adjustments for each camera unit film advancing mechanism and a common adjustment for simultaneously focusing both cameras.

A still further object of the invention is to provide a stereoscopic camera system which has focus and scene coverage adjustments for each camera, the film from one camera being suitable for a two-dimensional picture.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 6 is an end view of the convergence adjusting mechanism taken along the line 6—6 of Fig. 2.

Fig. 7 is a cross-sectional view taken along the line 7—7 of Fig. 6.

Fig. 8 is a detail cross-sectional view of the convergence adjusting mechanism taken along the line 8—8 of Fig. 2.

Fig. 9 is a detail view of a camera focusing adjustment mechanism taken along the line 9—9 of Fig. 2.

Figure 1:
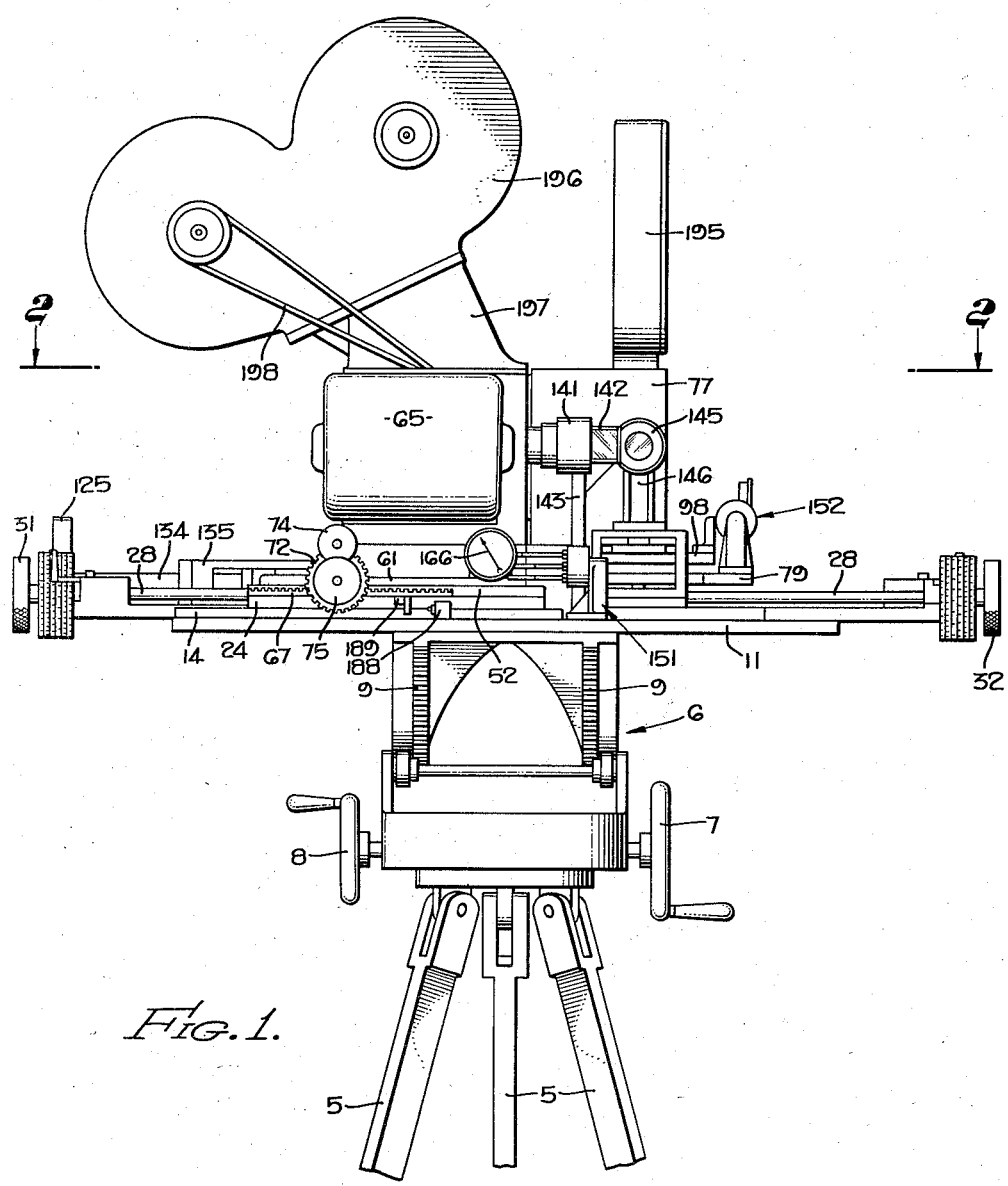
Fig. 1 is a front elevational view of a stereoscopic camera system embodying the invention.

Referring now to the drawings, in which the same numerals identify like elements, the stereoscopic camera system is mounted on a tripod having legs 5 and a universal mount 6. The hand wheel 7 will rotate the system in a horizontal plane, and the hand wheel 8 will rotate the system in a vertical plane by pinion gears meshing with the circular racks 9. On the universal mount 6, is a base plate 11, on which the entire stereoscopic camera system is mounted. On the base plate 11, are a plurality of rails, two being shown at 13 and 14 with their V grooves, and in which are mounted a plurality of ball bearings 15 and 16 held therein by corresponding grooves in movable guides 17 and 18. The rails 13 and 14 are fastened to plate 11 by screws 10. The rails 17 and 18 are fixedly attached by suitable screws 21 and 22 to a plate 24. The plate 24 is attached by a screw 25 to an interiorly threaded boss 26, through which passes a screw threaded section 27 of a shaft 28. Thus, any rotation of the shaft 28 will rotate section 27 and move the plate 24 along the rails 13 and 14. The shaft 28 has mounted on each end thereof two hand knobs 31 and 32, and, through miter gears 33, the shaft 28 is rotatable by hand knob 35, which is mounted on a shaft 36 and which also has thereon a threaded section 38 within an internally threaded boss 39. A bracket 40 holds the two shafts and miter gears in fixed positions.

The boss 39 is connected to a plate 42, similar to plate 24, and moves plate 42 along the rails 43 and 44 having ball bearings 45 and 46 held therein by the grooves in movable guides 47 and 48 attached to plate 42. The above described gear and shaft connections illustrate how the plates 24 and 42 may be moved simultaneously at right angles to one another by the rotation of any one of the hand knobs 31, 32, or 35.

Figure 3:
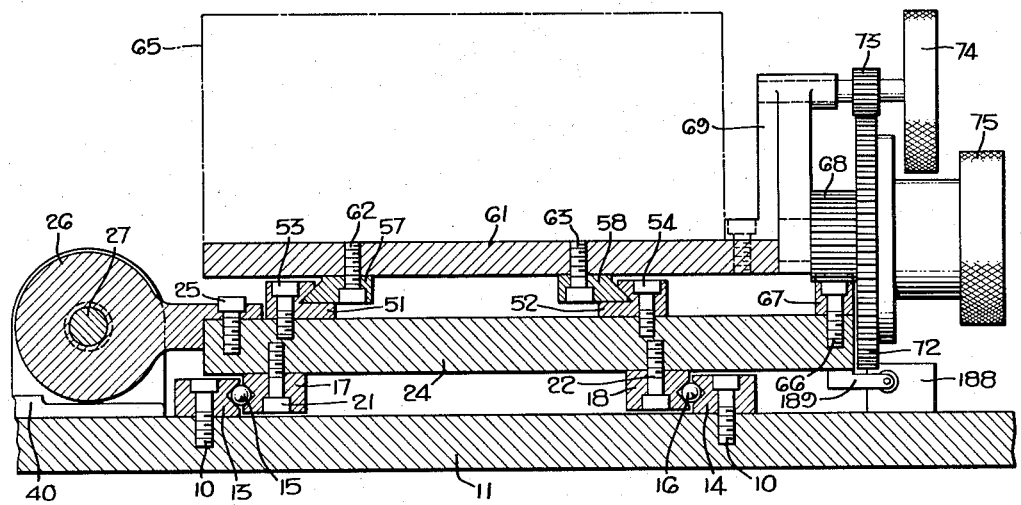
Fig. 3 is a cross-sectional view taken along the line 3—3 of Fig. 2.

Referring particularly to Fig. 3, there is mounted on the plate 24 a pair of fixed rails 51 and 52 and attached to the plate 24 by respective screws 53 and 54. The rails 51 and 52 have V grooves therein, which accommodate movable guides 57 and 58 attached to a camera mounting plate 61 by respective screws 62 and 63. A housing 65 for the film advancing mechanism of the camera unit having the right-angle optical system is mounted on plate 11 in any suitable manner.

Attached by screws such as shown at 66, is a straight rack 67, which is in mesh with a gear 68 rotatable on a shaft in a bracket 69. Also rotatable with gear 68 is a larger gear 72 in mesh with a small gear 73. The gear 73 is on a shaft in bracket 69 and on which is mounted a hand wheel 74, while the gears 68 and 72 are mounted on the same shaft as a hand wheel 75. The above described mechanism permits the camera unit housing 65 to be moved along the rails 51 and 52 rapidly by rotation of the hand knob 75, and slowly, for fine adjustments of the position thereof, by hand knob 74.

Figure 2:
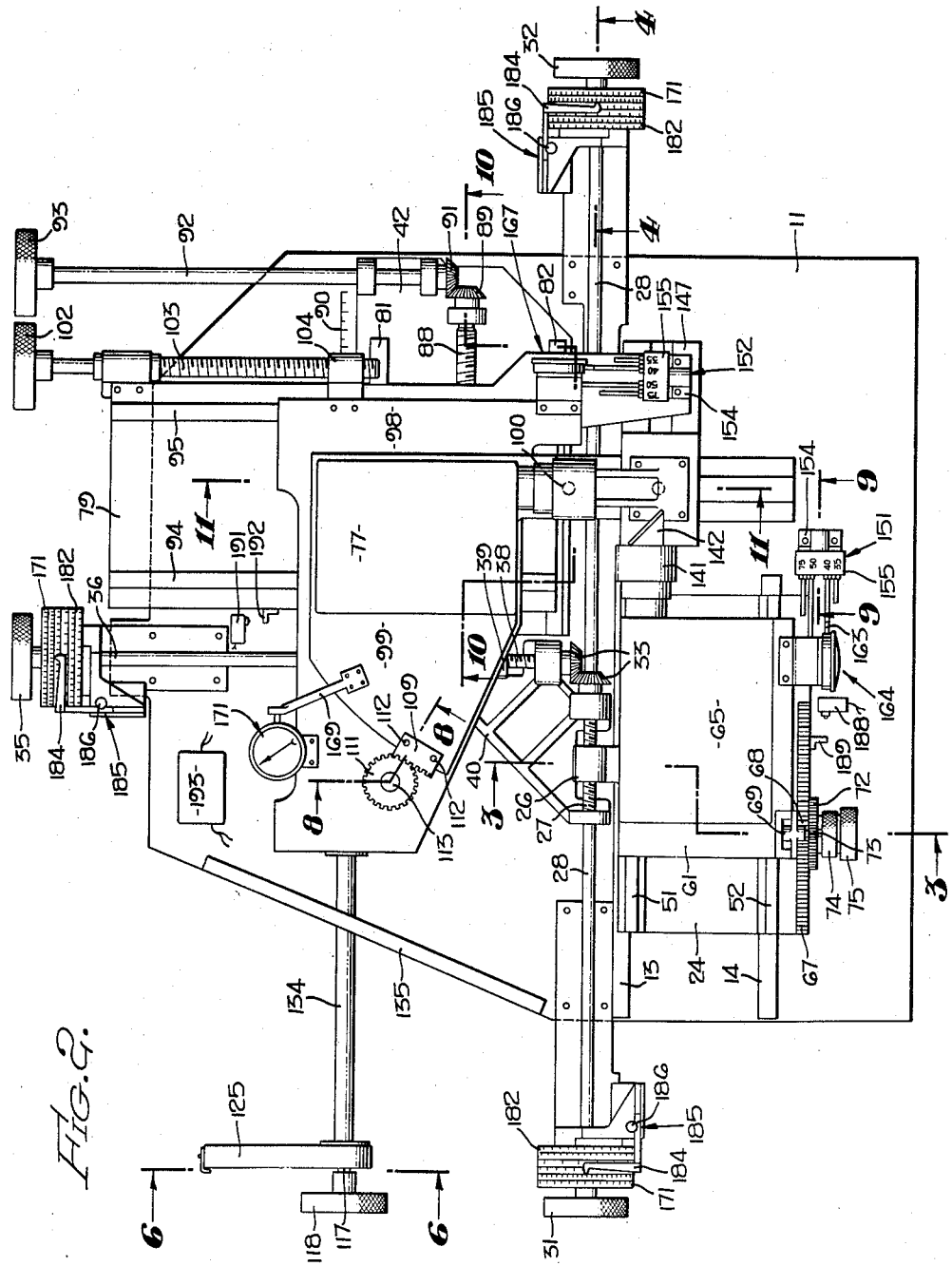
Fig. 2 is a plan view of the invention taken along the line 2—2 of Fig. 1.
Figure 10:
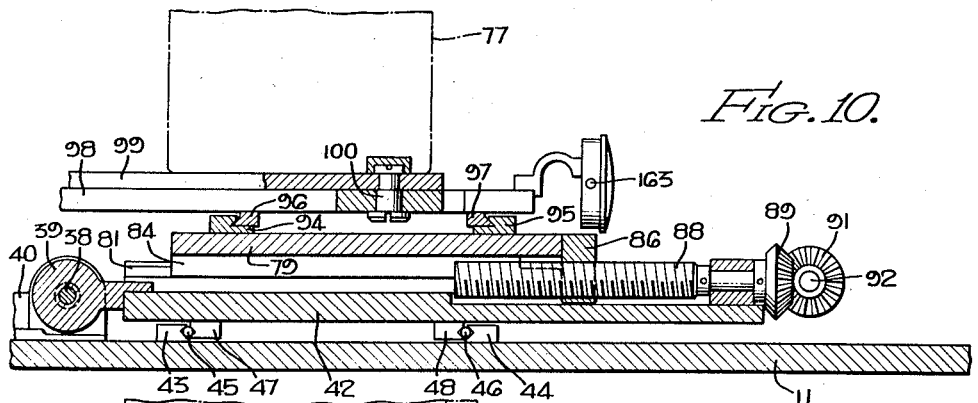
Fig. 10 is a cross-sectional view of the transverse shifting interaxial adjusting mechanism for a camera taken along the line 10—10 of Fig. 2.
Figure 11:
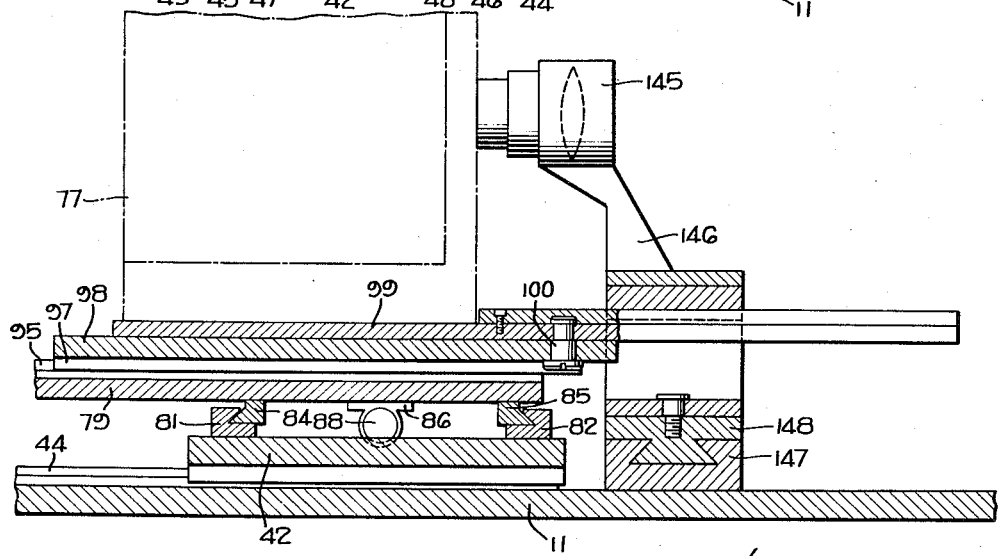
Fig. 11 is a cross-sectional view of the interaxial adjusting mechanism taken along the line 11—11 of Fig. 2.

The mechanism for adjusting the other housing 77 of the other camera unit of the system, is shown in Figs. 2, 10, and 11. Referring now to Figs. 10 and 11, the plate 42 has mounted thereon a plate 79, which is mounted on rails. These rails are shown in Fig. 11 at 81 and 82. In the grooves of the rails 81 and 82, are movable guides 84 and 85, respectively. A nut 86 attached to one end of plate 79 has threaded therein a rod 88 having a miter gear 89 mounted on the end thereof, gear 89 being in mesh with its companion miter gear 91. The gear 91 is mounted on one end of a shaft 92 having a hand knob 93 on the other end thereof. Thus, by rotation of the hand knob 93, which causes rotation of the rod 88, the plate 79 may be moved along the rails 81 and 82, which movement is perpendicular to its movement by screw section 38. A scale 90 indicates the position of plate 79.

Mounted on plate 79 is another pair of rails 94 and 95, in the V grooves of which are movable guides 96 and 97, respectively. The guides carry a fixed plate 98 in contact with a rotatable plate 99, the fulcrum point being provided by a two-diameter screw bolt 100. The camera unit housing 77 is mounted on the adjustable plate 99 in any suitable manner. The mechanism for adjusting the plates 98 and 99 along the rails 94 and 95 is a hand knob 102 mounted on the end of a threaded rod 103, which is threaded through a boss 104 attached to the plate 98. Thus, rotation of the hand knob 102 will adjust camera unit housing 77 along its optical axis on the rails 94 and 95 on the plate 79.

Referring now to Figs. 2, 6, 7, and 8, a mechanism is shown for rotating the camera unit housing 77 on fulcrum 100. This is accomplished by a segment 109 of a circular rack in mesh with a pinion 111, the rack being attached to the plate 99 by screws such as shown at 112. The pinion 111 is mounted on a shaft 113 passing through a bearing 114 and on which is also mounted a worm gear 115. In mesh with the worm gear 115, is a worm 116 on a shaft 117 having a hand knob 118 on the end thereof. As shown in Fig. 7, a gear 121 is mounted on the shaft 117, the gear 121 being in mesh with the gear 122, which, in turn, is in mesh with a large indicia plate gear 123 mounted on the shaft 124 of a housing 125. Thus, any rotation of the shaft 117 will rotate the gear 123 on which is mounted an indicia plate 127 by screws 128 and 129. A pointer 131 is mounted by a screw 132 on the housing 125. The shaft 117 is mounted in a casing or tube 134 which passes through a slot in a stiffening member 135, which is attached to the bed plate 11. Since this mechanism just described is movable along the axis of the shaft 117 and transversely thereof with plate 98 by knobs 93 and 102, the slotted member 135 provides a support therefor.

Thus, in the mechanism just described, the camera unit housing 65 may be adjusted along its optical axis on rails 13 and 14 by the rotation of shaft 28 or shaft 36 and movable along its optical axis on rails 51 and 52 by rotation of either hand wheel 74 or 75. The camera unit housing 77, however, may be adjusted by four mechanisms in three directions: (1) along its optical axis on rails 43 and 44 by rotation of either shaft 28 or 36; (2) at right angles to its optical axis on rails 81 and 82 by the rotation of screw 88 and hand knob 93; (3) also along its optical axis on rails 94 and 95 by rotation of screw 103 and hand knob 102; and (4) rotated on fulcrum 100 by rotation of shaft 117 by hand knob 118.

As shown in Figs. 1, 2, and 11, the optical unit for camera unit housing 65 comprises an objective lens housing 141 and a reflective prism unit 142 mounted on a bracket 143, which bracket is attached to the base plate 11, and thus, remains fixed at all times. The optical unit 145 for the camera unit housing 77 is mounted on a bracket 146, which is movable on a fixed rail 147 and movable guide 148 as the camera unit housing is moved perpendicularly to the optical axis of the objective lens 145 along rails 81 and 82. Thus, the optical units 141—142 and 145 may be shifted toward and away from one another to provide the proper interaxial separation, dependent upon the shot being taken and the focal lengths of the objective lenses. (See Fig. 12.) The optical centers of the two units shown by the circles may have a minimum separation, shown by "A," of approximately one and one-fourth inches, which is less than the interocular distance, thus insuring the minimum of distortion on close-up shots without any loss of light, which occurs in a half silvered mirror system which may permit closer interaxial positioning. The present system can obtain this close positioning without vignetting.

To properly position each individual camera unit housing when lenses of different focal lengths are used, units 151 and 152 are used. These units are alike, so unit 151, shown in cross-section in Fig. 9, will be discussed in detail. The unit constitutes a bracket 154 on which is rotatably mounted a cylindrical collar 155 on a shaft 156. The collar 155 has mounted in one face thereof and perpendicular thereto a plurality of different length rods, three of which are shown in Fig. 9 at 157, 158, and 159. The other face of the collar has detents therein, into which a ball 161 is held under pressure of a spring 162. The collar 155 is thus held in any selected position.

The collars of the units 151 and 152 have indicia thereon indicating the position to which the disc is to be rotated for lenses of the different focal lengths. For instance, if a forty millimeter focal length lens is to be used, the collar 155 is rotated to position the proper length rod for contact with a lever 163 of a precision position indicator 164 mounted on the camera unit housing mounting plate 61. Before this step, however, any one of knobs 31, 32, or 35 is adjusted to focus the camera unit at infinity. After the collar 155 has been adjusted to the proper position, the hand knob 75 is turned to bring the camera unit housing into contact with the selected rod. When contact is made, the vernier hand knob 74 is then turned to rotate the indicator needle 166 to zero position. (See Fig. 1.) This is now the correct position for infinity focus of the optical unit 141—142 on the film in camera unit housing 65 using a forty millimeter lens.

The camera unit housing 77 is similarly adjusted by rotating the collar of the unit 152 to the forty millimeter focal length lens position, and then, by use of hand knob 102, the camera 77 is moved into position so that its precision indicator 167 indicates the exact infinity focus position of the lens of camera unit housing 77, the camera position having been adjusted by any one of knobs 31, 32, and 35.

Figure 12:
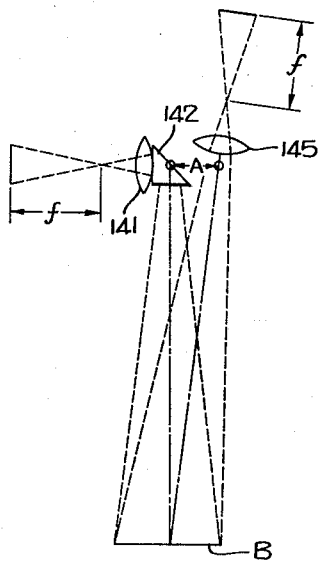
Fig. 12 is a diagrammatic view of the optical paths of the stereoscopic system embodying the invention.

Now, by means of hand knob 93, camera 77 is interaxially adjusted to camera unit housing 65 so that the optical axes of the camera units have the proper separation for the focal length of the lenses and the scene to be photographed. When this is accomplished, the hand knob 118 is rotated to properly converge the optical axes, as shown in Fig. 12, so that each camera unit covers the same area to be photographed at the selected projection screen position "B." That is, any objects between the position "B" and the camera units in Fig. 12 will appear in front of the screen, and objects beyond position "B" will appear behind the screen when viewed.

To indicate the position of plate 99 with respect to plate 98 for parallelism of the two optical systems, an arm 169 is mounted on plate 98 and is adapted to contact a third precision indicator 171. Thus, the camera unit housing 77 may be accurately positioned so that its optical axis is parallel with the optical axis of the optical unit 141—142. From this point, the hand knob 118 can adjust the convergence of the two optical paths, the scale on indicia plate 127 indicating at what distance from the camera units the position "B" occurs. A series of scales are on plate 127 to indicate coinciding images for different interaxial positions of the camera units.

Figure 4:
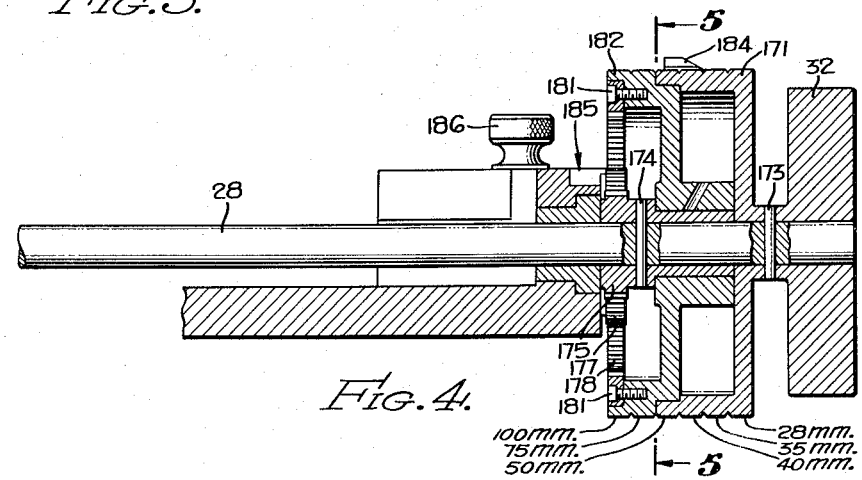
Fig. 4 is a cross-sectional view taken along the line 4—4 of Fig. 2.
Figure 5:
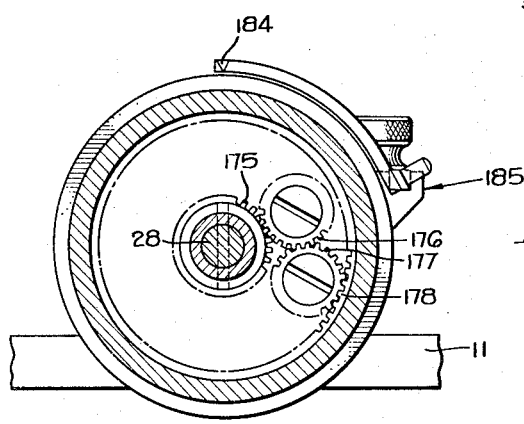
Fig. 5 is a detail view of the indicia dial mechanism taken along the line 5—5 of Fig. 4.

After these adjustments have been determined, the cameraman is now in a position to focus the camera units on a scene to be photographed stereoscopically. As mentioned above, this is accomplished by rotating any of the hand knobs 31, 32, and 35. As shown in detail in Figs. 4 and 5, mounted on the shaft 28 is a cylindrical and rotatable indicia casing 171, on which are four scales representing lenses of twenty-eight millimeters, thirty-five millimeters, forty millimeters, and fifty millimeters. The casing 171 is pinned to the shaft 28 by a pin 173, and thus, rotatable with the shaft. Also pinned to the shaft 28 by pin 174, is a gear 175 in mesh with a gear 176, which, in turn, is in mesh with a gear 177. The latter gear is in mesh with an internally threaded gear 178. The gear 178 is fastened by screws 181 to a second indicia casing 182, on which are indicia for lenses of seventy-five millimeters and one hundred millimeters. This indicia plate will rotate at a slower speed than plate 171, which is necessary to obtain full calibration in one revolution of shaft 28. A pointer 184, mounted on a slidable unit 185, may be positioned at any particular scale, according to the lens being used at the time. After adjustment, the pointer is held in position by a thumb nut 186.

From the above description, it will be observed that the two units having housings 65 and 77 may be independently adjusted for optical unit separation and for different focal length lenses, after which film in the two camera units may be simultaneously adjusted according to the distance of the scene being photographed. The optical axis of the two camera units may be brought to a minimum separation, which is required for close-up shots, and separated to provide the proper stereoscopic relationship for the longer shots.

To protect the two optical units from contacting, and thus, damaging each other by over-rotation of the hand knobs 31, 32, 35, and 93, a buzzer system is employed. This system is shown as constituting a buzzer switch 188, which is fixed, and a contact member 189, which is mounted on the camera unit housing plate. For camera unit housing 77, the switch is shown at 191 and the stop mounted on the camera unit housing plate is shown at 192. Thus, when either camera unit housing 77 or camera unit housing 65 is moved beyond a safe distance with respect to one another, the respective stop will close its respective switch, which will ring a buzzer in box 193, which contains its energizing battery. The camera units may be enclosed in a "blimp" to prevent the noise of the mechanism from affecting a recording microphone.

Fig. 1 shows a film magazine 195 mounted on camera unit housing 77 and a film magazine 196 mounted on camera unit housing 65. The magazine 196 is mounted at an angle on a bracket 197 to prevent interference between magazines when short focal length lenses are used. The take-up reel in the magazine 196 is shown being driven by a belt 198. A similar drive is provided for magazine 195. The film advancing and shutter mechanisms in each camera unit housing may be mechanically connected by shafts and gears, or each camera mechanism driven with interlocked motors of a self-synchronous electrical system to maintain synchronism between the moving elements.

I claim:

1. In a stereoscopic camera system, a fixed base plate, means for mounting a first and a second camera mechanism slidably relative the base plate, each camera mechanism having means to advance a film in a plane substantially at right angles to the plane of film advance of the other, and each having an optical system including a lens, each optical system having the optical axis of its lens perpendicular to the film plane of the respective camera mechanism; the optical system for the first camera mechanism being fixed on the base plate and including means to bend a beam of light through an angle of 90°, the optical system for the second camera mechanism being slidably mounted on said base plate in a direction perpendicular to its optical axis for binocular adjustment, the first camera mechanism being mounted on an adjustable plate for movement parallel to said base plate, adjusting means for moving said adjustable plate on the fixed base plate, means for moving said adjustable plate in the direction of the optical axis of the lens in the first optical system, another adjustable plate movably mounted on said fixed base plate, adjusting means on the fixed base plate for moving said other plate in the direction of the optical axis of the second optical system, a third adjustable plate movably mounted on said other adjustable plate, adjusting means for moving said third adjustable plate in a direction perpendicular to the optical axis of the second optical system, said second camera mechanism being adjustably mounted on said third adjustable plate, and rotatable means on said base plate for simultaneously adjusting the first and second plates to move each camera mechanism in the direction of the optical axis of its lens system, said rotatable means having controlling means for adjustment thereof from a plurality of positions, and said second camera mechanism being pivotally mounted on said third adjustable plate.

2. The structure according to claim 1 including adjustable stop means for each camera mechanism having means to limit the adjustment of each camera mechanism in one direction for different focal length lenses.

References Cited in the file of this patent

UNITED STATES PATENTS

| | | |
|---|---|---|
| 852,476 | Verbeck | May 7, 1907 |
| 2,198,815 | Haskin | Apr. 30, 1940 |
| 2,337,363 | Ames | Dec. 21, 1943 |
| 2,630,737 | Ramsdell | Mar. 10, 1953 |
| 2,644,382 | Ayres | July 7, 1953 |

FOREIGN PATENTS

| | | |
|---|---|---|
| 614,473 | Great Britain | Dec. 16, 1948 |